United States Patent
Krauth et al.

[15] 3,668,292
[45] June 6, 1972

[54] APPARATUS FOR VAPOR FREE MELTING OF URANIUM CARBIDE OR PLUTONIUM CARBIDE

[72] Inventors: Axel Krauth, Wurzburg; Hans-Jürgen Telwes, Ruckingen, both of Germany

[73] Assignee: Nukem Nuklear-Chemie and-Metallurgie GmbH, Wolfgang bei Hanau (Main), Germany

[22] Filed: July 17, 1970

[21] Appl. No.: 55,876

[52] U.S. Cl. ...................................................13/23, 13/34
[51] Int. Cl. .......................................................H05b 3/60
[58] Field of Search.................................13/1, 9, 23, 33, 34

[56] References Cited
UNITED STATES PATENTS

| | | | |
|---|---|---|---|
| 3,506,770 | 4/1970 | Schikarski et al. | 13/23 |
| 3,387,079 | 6/1968 | Hoppe et al. | 13/34 |

*Primary Examiner*—Bernard A. Gilheany
*Assistant Examiner*—R. N. Envall, Jr.
*Attorney*—Cushman, Darby & Cushman

[57] ABSTRACT

There is provided an apparatus for the vapor free melting of fuel carbides consisting of uranium carbide, plutonium carbide or mixtures of these carbides. The apparatus comprises a cylindrical melting tube and two posts serving as electrodes which form a closed reaction space. At least one electrode is moveable and the volume of the reaction space is changed during the melting process by readjustment of the upper post to the volume of the inserted material.

6 Claims, 3 Drawing Figures

INVENTORS
AXEL KRAUTH
HANS-JÜRGEN TEIWES

INVENTORS
AXEL KRAUTH
HANS-JÜRGEN TEIWES
BY Cushman, Darby & Cushman
ATTORNEYS

APPARATUS FOR VAPOR FREE MELTING OF URANIUM CARBIDE OR PLUTONIUM CARBIDE

The invention relates to an apparatus for the melting of uranium carbide, plutonium carbide and mixtures of these two carbides and/or reacted melts of uranium oxide, plutonium oxide and oxide mixtures thereof when mixed with carbon.

It is known that carbides can be melted by passing the electrical current directly through them or by using the electric arc process. However, the previously known methods can not be used when the fuel carbides contain uranium or plutonium. This is especially true when melting fuel carbides that contain plutonium because of the high and uncontrollable losses of vapor. It has not been possible, therefore, up to the present time to melt fuel carbides that contain plutonium while using realistic conditions of production and operation.

An apparatus has therefore been developed for the purpose of avoiding this disadvantage, which makes it possible to melt uranium carbide, plutonium carbide and/or mixtures of these two carbides under conditions that are to a great extent free from vapor and in a process whereby electrical current is passed directly through said carbides. When mixtures of uranium carbide and plutonium carbide are employed, the proportions are not critical and can be varied as desired. Generally such mixtures contain 80 to 99 percent by weight of uranium carbide and the balance plutonium carbide. The apparatus according to this invention consists of a pipe or tube made of electrically insulating oxide material, for example aluminum oxide, magnesium oxide, quartz glass or a crystalline glass that has become known under the mark "Pryoceram," whose coefficient of expansion is practically zero, and which is sealed on the bottom and the top by means of an adjustable graphite electrode. The graphite electrodes are used as connections and supply to the electrical current.

The advantages of the inventive apparatus are that the melting process takes place in a sealed reaction chamber and that the time for said process is extremely short. Losses in plutonium by vaporization of same are almost completely prevented in this process. The melt regulus is surrounded by an unmelted layer having a thickness of approximately 1 mm; the surrounding insulating pipe is thus not attacked by the melt.

Since during the melting process the volume of the material to be melted is reduced, the upper graphite electrode is vertically adjusted in order to maintain the electrical contact. An additional charge placed around the insulation tube, preferably made of the material to be melted, serves to reinforce the insulation jacket since this becomes highly stressed at the moment of the melting due to the strongly different temperature burden.

Since the carbides that have to be melted lose some of their volume during the melting process, the upper graphite electrode is extended vertically for the purpose of maintaining the electrical contact. Loose material, consisting preferably of the carbide melt is, in addition, placed around the insulating pipe and is used to support and brace the insulating jacket since this latter is subjected to high stresses at the moment of the melting because of the different temperature load which varies grossly.

The invention will be understood best in connection with the drawings wherein.

Figure 1:
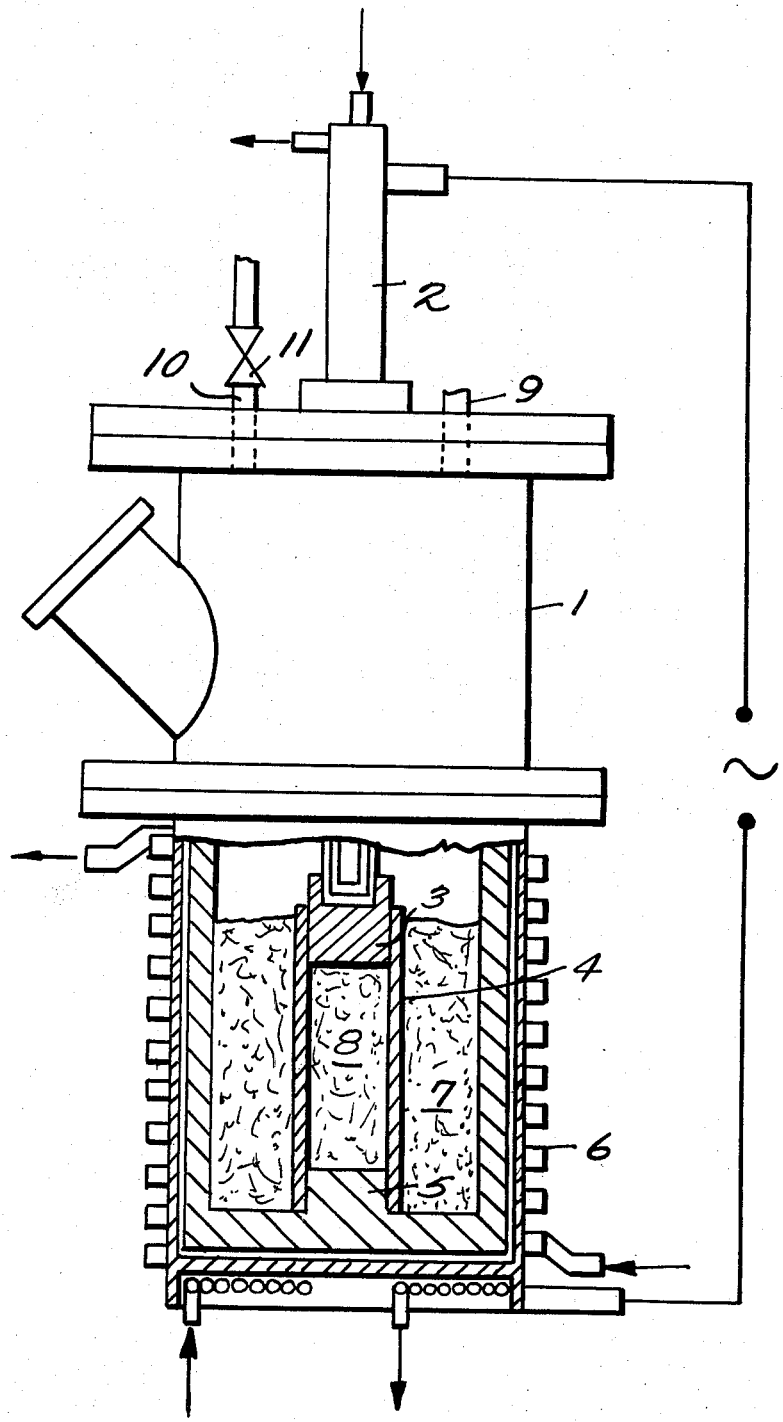
FIG. 1 is a vertical elevation partially broken away and in section of one form of apparatus of the invention.

Referring more specifically to FIG. 1, the apparatus consists of a water-cooled housing 1, a water-cooled upper electrode 2 and a graphite electrode 3 which is used as the connection for the supply of electrical current. The inner tube consists of an electrically non-conducting oxide material 4 so that the electrical current can only be passed through the graphite electrode 5. The apparatus is installed in a water-cooled, gas-tight copper crucible 6. Oxides that are fire-proof at high temperatures are used as the material for the inner tube, as well as quartz glass or Pyroceram. The flow of the cooling medium is shown by the arrows in FIG. 1. Loosely heaped material 7, consisting of the same material as that which is to be melted, is placed around the tube 6 for the purpose of support in case the tube should break. This tube contains the powder charge of the material to be melted 8. Numerals 9 and 10 designate the supply and discharge or exhaust lines for the supply of the protective gas or — after the valve 11 has been closed — for the purpose of removing same.

A second form of construction of the apparatus consists of a water-cooled copper crucible which has fitted into it a tube made of quartz glass or Pyroceram. This does not burst even under the most extreme loads of temperature. Graphite electrodes which are slidingly fitted on the top and bottom, border the melting chamber and thus make possible a vapor free melting of the material. The lower electrode is removed after the material has been melted and the melt regulus is forced out and into a container, held ready for this purpose, by means of the upper die. The upper electrode is subsequently removed and the lower electrode is reinserted into the quartz tube and the apparatus is thus again ready and in position to accept another charge. The execution of the melting process in a succession of charges is possible through the simple construction in a glove box under a protective gas atmosphere.

Figure 2:
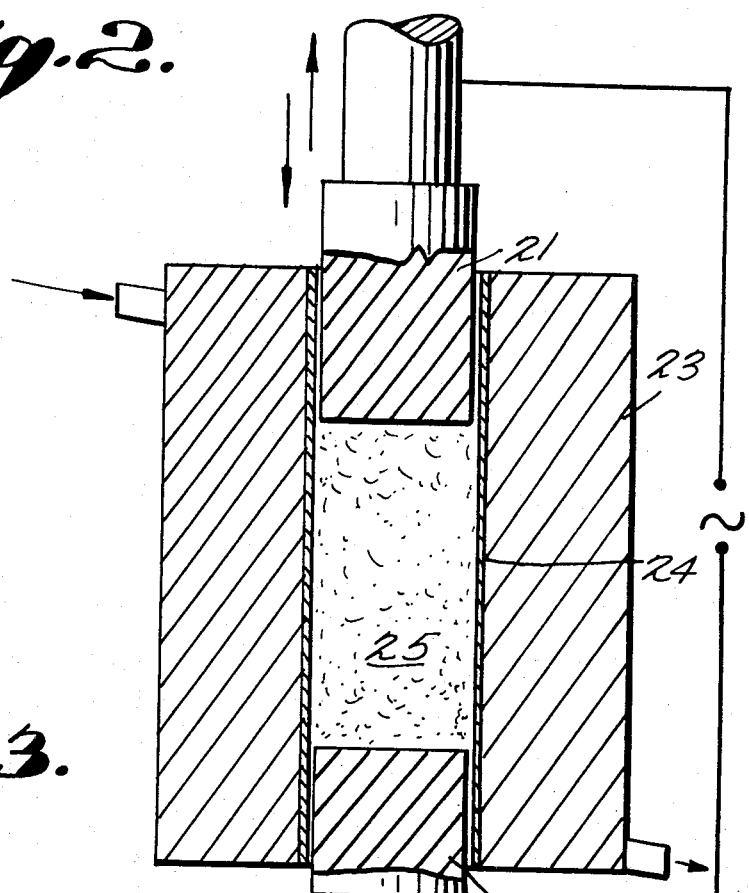
FIG. 2 is a vertical sectional view of a different type of apparatus of the invention.

As shown in FIG. 2, the numerals 21 and 22 designate the upper and lower graphite electrodes. 23 is the copper crucible, 24 the fire-proof melting tube and 25 the powder charcoal of the carbide that has been filled into the tube. The flow of cooling medium is shown by the single arrows and the double arrows indicate the direction of movement of the electrodes.

It is possible to produce carbides with a different form of construction through the reaction of fuel oxide and carbon and subsequently to melt the carbides formed. The upper electrode in this apparatus is offset in its lower portion to a reduced diameter. After the electrode has been slid in place in the insulating tube, there is formed an annular slot or clearance through which the carbon monoxide, which is released during the reaction, can escape. The electrode, after completion of the reaction, and because the material of the reaction has decreased in volume, is lowered so much that the upper, fitted portion seals the insulating tube. The reacted material is then melted in this sealed chamber by increasing the voltage of the current. The melting process itself takes only about one second.

Figure 3:
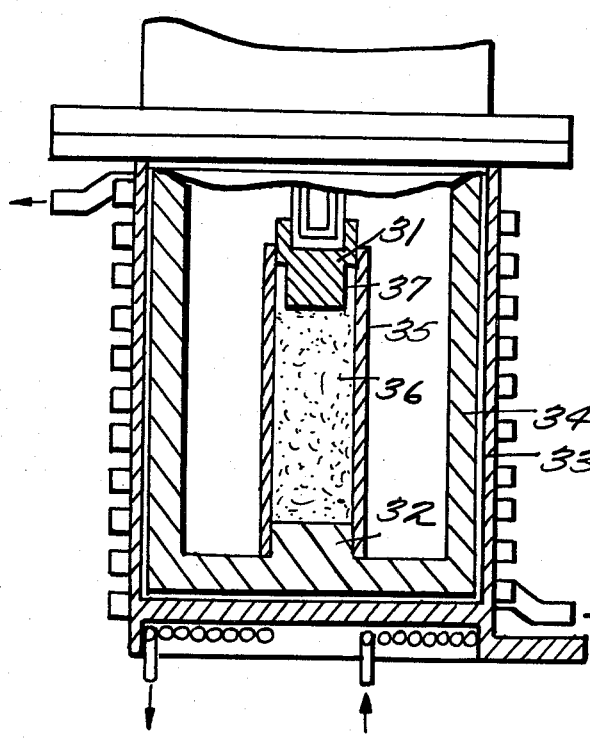
FIG. 3 is a vertical section of another apparatus within the invention.

In an additional form of the invention as shown in FIG. 3 of the drawings, the upper and lower electrodes are designated 31 and 32 respectively, the copper crucible is 33 and numeral 34 represents the inner graphite crucible. Numeral 35 designated the insulating tube and 36 the powdery material that is to be melted. The reduced or offset portion 37 which forms the annular slot or clearance for the escape of the gases of the reaction is found at the upper end of electrode 31.

The operation of the inventive apparatus is illustrated further with the aid of the following examples. Unless otherwise indicated, all parts and percentages are by weight.

EXAMPLE 1

The lower graphite electrode is inserted into an insulating tube having a length of 80 mm. and an inner diameter of 20 mm; 100 grams of PuC is then filled into the tube (FIG. 1). The material that has thus been filled into the tube had a particle size less than 1,100 $\mu$m. The outer layer of supporting carbide material is now placed around the insulating tube and the upper, slidingly fitted graphite electrode, is inserted into the tube until it reaches the material to be melted. Both electrodes now form a sealed melting chamber with the insulating tube. Electrical current of approximately 30 volts is then supplied to both electrodes in a protective gas atmosphere (Argon). A current of about 1,600 amperes causes the PuC to melt in just a few seconds. The upper electrode is pushed further inside the tube in order to maintain the electrical contact because the volume is reduced during the process of melting.

The PuC is removed after it has been cooled down. The yields of melted material amount to 60 to 70 percent of the amount filled into the tube at the beginning of the process.

EXAMPLE 2

The lower graphite electrode is inserted into an insulating tube made of aluminum oxide and having a length of 110 mm. and an internal diameter of 45 mm. A 300 gram mixture of uranium dioxide powder and carbon containing 20 weight percent plutonium dioxide powder is then filled into the tube and the upper electrode is put in place (FIG. 3).

An electrical current of approximately 30 volts is supplied to both electrodes in a vacuum. A current of approximately 1,600 amperes heats the mixture to the temperature necessary for the reaction, namely from 1,500° to 1,800° C. The upper electrode has in its lower portion a diameter that is 2 mm. smaller so that the carbon monoxide, which is released during the reaction, can escape through the annular slot thus formed. Because the volume in the tube decreases, the upper electrode is pushed deeper into the tube in order to maintain the electrical contact.

The upper portion of the electrode which has been dimensioned to fit the insulating tube, slides into the tube after the process of reaction is ended and in this manner seals the reaction chamber. The electrical current is then increased in a protective gas atmosphere ( Argon) and the melting process is thus accomplished.

The melted carbide is removed after it has cooled down. The yield amounted to 50 to 60 percent of the input.

EXAMPLE 3

A 300 gram mixture of UC and PuC (20 percent of the weight) is filled into a tube made of quartz glass, having a length of 100 mm. and a diameter of 100 mm, after the lower graphite electrode has been inserted ( FIG. 2). The mixture previously was ground to a particle diameter of less than 1,000$\mu$m of the particles. The upper graphite electrode is fitted into place and the result is a closed melting chamber. The electrical current of approximately 2,000 amperes at a voltage of 30 flows through the material to be melted and accomplishes this in a few seconds. The upper electrode, because the volume of the material to be melted decreases, is forced further down into the tube in order to maintain the electrical contact. The heat is removed by a water-cooled block of copper that is dimensioned to fit the quartz tube. The lower electrode is removed and the upper electrode forces the melted material downwardly into a container held ready for this purpose. The upper electrode is then removed and the lower electrode is slid into place into the quartz tube and the entire apparatus is once again in a position to receive another charge. The next process of melting can then be accomplished.

If the apparatus is set up on a glove box in which partial pressures of 50 ppm. $O_2$, 50 ppm. $H_2O$ and 100 ppm. $N_2$ are maintained, it is possible, for practical purposes, to have a continuous melting operation.

What is claimed is:

1. An apparatus for the vapor free melting of fuel carbides consisting of uranium carbide, plutonium carbide or mixtures thereof, said apparatus comprising a cylindrical melting tube, an upper adjustable electrode and a lower electrode, at least one of said electrodes being moveable in said melting tube, said electrodes and said melting tube defining a closed reaction space, the volume of said space being adjustable during the melting process by readjustment of the upper electrode further into the container to form a container having the volume of the inserted carbide.

2. An apparatus according to claim 1 wherein the top of the upper electrode submergeable in the melting tube is cylindrical in form.

3. An apparatus according to claim 2 wherein the top of the upper electrode has a reduced diameter in its lower half.

4. An apparatus according to claim 3 wherein the lower and upper electrodes consist of graphite.

5. An apparatus according to claim 1 wherein the melting tube consists of an electrical, insulating oxide material and is surrounded by a fitted block of copper provided with cooling means.

6. A method for the vapor free melting of a fuel carbide from the group consisting of uranium carbides, plutonium carbide and mixtures thereof comprising placing the carbide in a cylindrical melting tube closeable by an upper electrode and a lower electrode to form a reaction space, at least one of said electrodes being moveable in said melting tube, closing said reaction space, passing a current between said electrodes to melt said carbide and reduce the volume thereof and readjusting said moveable electrode so that the reaction space is reduced to conform to the new volume of said carbide.

* * * * *